United States Patent [19]
Khuu

[11] Patent Number: 6,125,006
[45] Date of Patent: Sep. 26, 2000

[54] VOICE COIL MOTOR ACTUATED VIDEO DATA CARTRIDGE RELEASE

[75] Inventor: Hong Khuu, Fremont, Calif.

[73] Assignee: Castlewood Systems, Inc., Pleasanton, Calif.

[21] Appl. No.: 08/970,867

[22] Filed: Nov. 14, 1997

[51] Int. Cl.[7] .................................................. G11B 21/22
[52] U.S. Cl. ...................................... 360/105; 360/99.06
[58] Field of Search ........................... 360/99.02, 99.06, 360/105; 369/75.2, 77.2

[56] References Cited

U.S. PATENT DOCUMENTS

| | | | |
|---|---|---|---|
| 4,396,963 | 8/1983 | Wright | 360/99.06 |
| 4,488,187 | 12/1984 | Alaimo | 360/77 |
| 4,504,879 | 3/1985 | Toldi et al. | 360/105 |
| 4,630,190 | 12/1986 | Alaimo et al. | 364/167 |
| 4,683,506 | 7/1987 | Toldi et al. | 360/105 |
| 4,864,437 | 9/1989 | Couse et al. | 360/75 |
| 4,870,518 | 9/1989 | Thompson et al. | 360/97.01 |
| 4,920,462 | 4/1990 | Couse et al. | 360/78.04 |
| 4,965,685 | 10/1990 | Thompson et al. | 360/99.06 X |
| 4,965,691 | 10/1990 | Iftikar et al. | 360/133 |
| 4,974,103 | 11/1990 | Iftikar et al. | 360/97.01 |
| 5,034,837 | 7/1991 | Schmitz | 360/105 |
| 5,038,232 | 8/1991 | Grace | 360/73.03 |
| 5,189,575 | 2/1993 | Onooka et al. | 360/105 |
| 5,204,793 | 4/1993 | Plonczak | 360/97.01 |
| 5,218,503 | 6/1993 | Martin | 360/133 |
| 5,262,918 | 11/1993 | Tannert | 360/133 |
| 5,317,464 | 5/1994 | Witt et al. | 360/99.08 |
| 5,377,065 | 12/1994 | Morehouse et al. | 360/105 |
| 5,440,436 | 8/1995 | Iftikar et al. | 360/99.12 |
| 5,444,586 | 8/1995 | Iftikar et al. | 360/99.12 |
| 5,513,055 | 4/1996 | McGrath | 360/97.01 X |
| 5,526,212 | 6/1996 | Drouin | 360/137 |
| 5,535,072 | 7/1996 | Witt et al. | 360/99.06 |
| 5,537,376 | 7/1996 | Ikuma | 369/77.2 |
| 5,570,252 | 10/1996 | Sumner et al. | 360/133 |
| 5,617,397 | 4/1997 | Jones et al. | 369/772 |
| 5,699,210 | 12/1997 | Thompson et al. | 360/99.06 |
| 5,724,216 | 3/1998 | Iftikar et al. | 360/99.06 X |

*Primary Examiner*—William R. Korzuch
*Attorney, Agent, or Firm*—Townsend and Townsend and Crew LLP

[57] ABSTRACT

The invention provides devices, systems, and methods for storing and archiving digital video and other data. A voice coil motor effects release of a removable hard disk cartridge from a disk drive. The voice coil motor is adapted for positioning a data transfer head along a recording surface of a rigid magnetic recording disk, and also moves the data heads from the recording surface to a "park" position away from the recording surface. This allows the disk to spin down within the cartridge while the cartridge is safely restrained inside the disk drive. Once it is safe to remove the cartridge from the drive, the voice coil motor can move beyond the park position to actuate a release linkage. The cartridge is typically expelled from the receiver of the disk drive by biasing springs. Hence, the present invention avoids the necessity to resort to a dedicated electromechanical actuator to expel the digital video cartridge from the disk drive.

12 Claims, 11 Drawing Sheets

VOICE COIL MOTOR ACTUATED VIDEO DATA CARTRIDGE RELEASE

BACKGROUND OF THE INVENTION

The present invention is generally related to recording systems for digital video and other data, and in particular, provides devices and methods which make use of a head positioning voice coil motor to effect release of a removable disk cartridge from a disk drive.

Video Cassette Recorders ("VCRs") dominate the consumer video market, due in part to their combination of low cost and recording capabilities. VCR analog magnetic tape recording cassettes can be used to record, play-back, and store video images in a format which is well adapted for use with existing analog television signals. The ability to record allows consumers to use the standard VHS VCR to save television shows and home movies, as well as for play-back of feature films.

The structure of VCR systems and recording media are adapted to record and archive existing television signals. Specifically, a large amount of analog data is presented on a standard television screen during a standard length feature film. VCR systems record this analog data using analog tape recording media. The VCR tape cassettes can be removed from the recording/play-back equipment for storage, thereby minimizing the system costs when large numbers of movies are stored.

While VCR systems successfully provide recording and archive capabilities at low cost, these existing consumer video systems have significant disadvantages. For example, accessing selected portions of a movie stored on a VCR tape can be quite slow. In particular, the cassette must be rewound to the beginning of the movie between each showing, which can involve a considerable delay. Additionally, transferring data to and from the tape takes a substantial amount of time. There has been little incentive to provide high speed accessing and transfer of the video data, as movies are typically recorded and played by the consumer in real time. Alternatives providing faster access are commercially available (for example, optical video disks), but these alternatives generally have not been able to overcome the VCR's low cost and recording capabilities.

Recent developments in video technology may decrease the VCR's advantages over alternative systems. Specifically, standard protocols have recently been established for High Definition TeleVision ("HDTV"). Although digital video cassette tapes are already available, the amount of data presented in a single HDTV feature film using some of the new protocols will represent a substantial increase over existing digital VCR system capacities. Optical disks may be able to accommodate these larger quantities of digital data. Unfortunately, despite many years of development, a successful low cost optical recording system has remained an elusive goal.

Personal computer magnetic data storage systems have evolved with structures which are quite different than consumer video storage systems. Modern personal computers often include a rigid magnetic disk which is fixed in an associated disk drive. These hard disk drive systems are adapted to access and transfer data to and from the recording surface at high rates. It is generally advantageous to increase the total data storage capacity of each hard disk, as the disks themselves are typically fixed in the drive system. Hence, much of the data that is commonly used by the computer is stored on a single disk.

The simplicity provided by a fixed disk drive system helps maintain overall system reliability, and also helps reduce the overall storage system costs. Nonetheless, removable hard disk cartridge systems have recently become commercially available, and are now gaining some acceptance. While considerable quantities of computer data can be stored using these removable hard disk cartridge systems, their complexity, less than ideal reliability, and cost has limited their use to selected numbers of high-end personal computer users.

One disadvantage of known removable hard disk drive systems is their complexity. For example, existing removable hard disk drives generally include a dedicated electromechanical actuator to release the cartridge after spin down. Hard disks typically spin at a considerable speed during operation, and handling of the disk cartridge while the disk is still spinning inside could result in damage to the recording surface of the disk within the cartridge. To avoid such damage, disk cartridges are often restrained within the disk drive until the disk "spins down" (slows in rotational speed, often to a complete stop). Only after the disk's rotation has slowed or stopped is the dedicated release actuator energized. This release actuator system adds significantly to the cost and complexity of known removable computer hard disk systems.

In light of the above, it would be desirable to provide improved systems, devices, and methods for storing video and other data. It would be particularly desirable if these improved systems, devices and methods were adapted for digital data such as the new HDTV protocols, and had the ability to record, archive, access, and transfer digital feature films at high speeds, with good reliability, and at a low system cost, thereby expanding the benefits from the tremendous economies of scale of the consumer video market.

SUMMARY OF THE INVENTION

The present invention provides devices, systems, and methods for restraining and releasing recording cartridges from within disk drives, particularly for recording and archiving of digital video and other data. The systems of the present invention generally rely on a single voice coil motor to position a data transfer head along a recording surface, and also as a cartridge release actuator. In most embodiments, the voice coil motor moves the data head from adjacent the recording surface to an intermediate position beyond the edge of the recording surface prior to releasing the cartridge. While the head is in this intermediate position, the cartridge is restrained within the disk drive, and the disk can safely spin down within the cartridge, thereby avoiding damage which might occur if the cartridge were removed while the disk is spinning. Once it is safe to remove the cartridge from the drive, the voice coil motor moves the head beyond the intermediate position to actuate a release linkage. The linkage releases the cartridge, and biasing springs expel the released cartridge from the disk drive. By making use of the voice coil motor as a release actuator, the present invention avoids resorting to a dedicated electromechanical release actuator, thereby enhancing reliability and reducing overall system cost and complexity.

In a first aspect, the present invention provides a disk drive system comprising a cartridge containing a disk. The disk has a recording surface, and a housing defines a receptacle which receives the cartridge. A motor is adapted to position a data transfer head along the recording surface for transferring data between the recording surface and the head. The motor is mechanically coupled to the receptacle so that the cartridge is released from the receptacle by the motor.

In another aspect, the present invention provides a disk drive for use with a cartridge. The cartridge contains a rigid magnetic recording disk having at least one recording surface. The disk drive comprises a housing defining a receptacle which receives the cartridge. An arm is movably coupled to the housing, and a data transfer head is supported by the arm. A voice coil motor is adapted to position the head along the recording surface of the disk for transferring data between the recording surface and the head. The voice coil motor is capable of moving the head from the recording surface to first and second positions. A linkage mechanically couples the voice coil motor to the receptacle of the housing. The linkage restrains the cartridge in the receptacle when the head is at the first position to safely spin down the disk. The linkage releases the cartridge from the receptacle when the voice coil motor moves the head to the second position.

In yet another aspect, the present invention provides a disk drive system comprising a cartridge containing a rigid recording disk. The disk has a recording surface, and a housing has means for receiving the cartridge. Means are also provided for transferring data from the recording surface, the data transfer means movable along the recording surface. Additionally, the disk drive system includes means for positioning the data transfer means along the recording surface. The positioning means is coupled to the cartridge receiving means so that the cartridge can be released from the cartridge receiving means by actuation of the positioning means.

In a method according the present invention, a data transfer head is positioned along a recording surface with a motor so as to transfer data between the head and selected regions of the recording surface. The recording surface is disposed on recording media, and the recording media is removed from the receptacle by actuating a release mechanism with the motor.

DESCRIPTION OF THE PREFERRED EMBODIMENT

The devices, systems, and methods of the present invention generally make use of a head positioning motor to effect release of a hard disk cartridge from a disk drive. The cartridges will preferably contain a single two-sided rigid magnetic recording disk which is capable of storing at least about 2.4 gigabytes of data, ideally being capable of storing at least about 4.7 gigabytes of data. The cartridges, the disk drive systems, and the data storage methods of the present invention are particularly well suited for use in recording, archiving, and playing back digital video data. Due to the low cost, large capacity, and archivability provided by the recording system of the present invention, a standard length movie in a format as suitable for high definition television may be economically stored using no more than two cartridges, and ideally may be stored on a single cartridge having a single, two-sided hard disk. Additionally, these devices and methods will find applications for storing a wide variety of data for use with notebook computers, desktop computers, and more powerful computer workstations.

Figure 1:
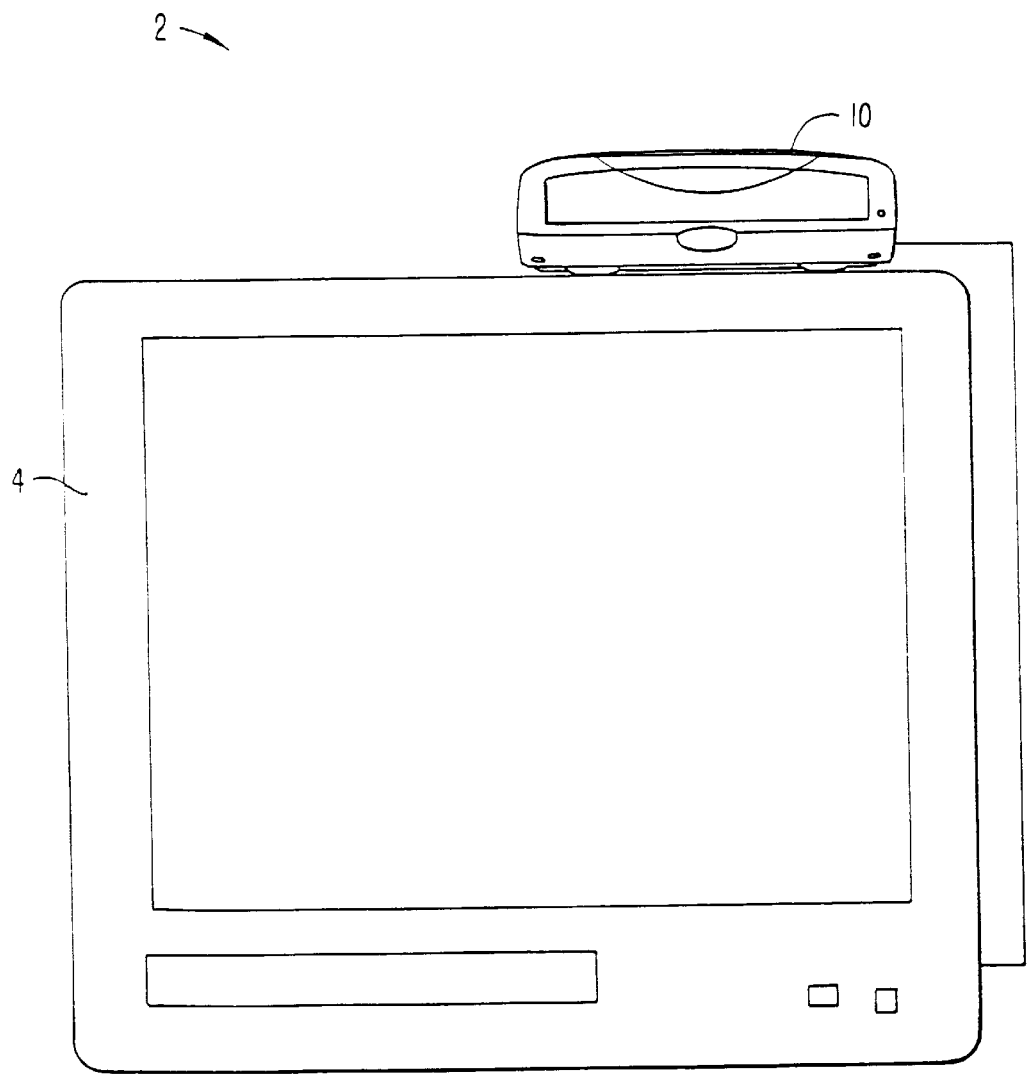
FIG. 1 is a schematic illustration of a video system including a high definition television and an external disk drive.

As schematically illustrated in FIG. 1, a video system 2 includes a high definition television ("HDTV") 4 which is coupled to an external disk drive 10. External drive 10 will read recorded digital data from a removable disk cartridge, and will transmit that data to HDTV 4. No general purpose computer need be coupled between external drive 10 and HDTV 4, although such a general purpose computer may be incorporated into video system 2 to allow flexible manipulation of the video data. In the exemplary embodiment, external drive 10 is less than 2 in. by less than 5½ in. by less than 7 in. The small size of the drive (and the small size of the disks on which the movies are stored) helps decrease the overall space which is required for both the video system and the associated movie library.

Figure 1A:
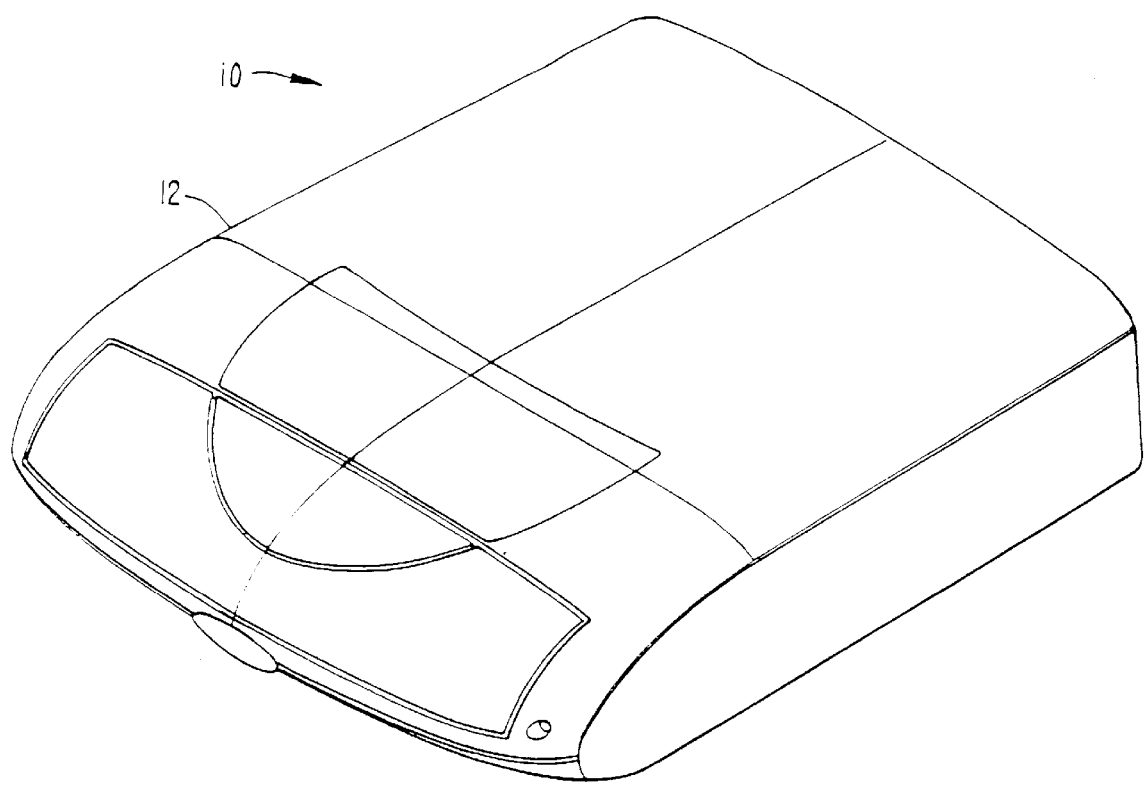
FIG. 1A is a perspective view of an external disk drive for use with a removable rigid recording disk cartridge, according to the principles of the present invention.
Figure 1B:
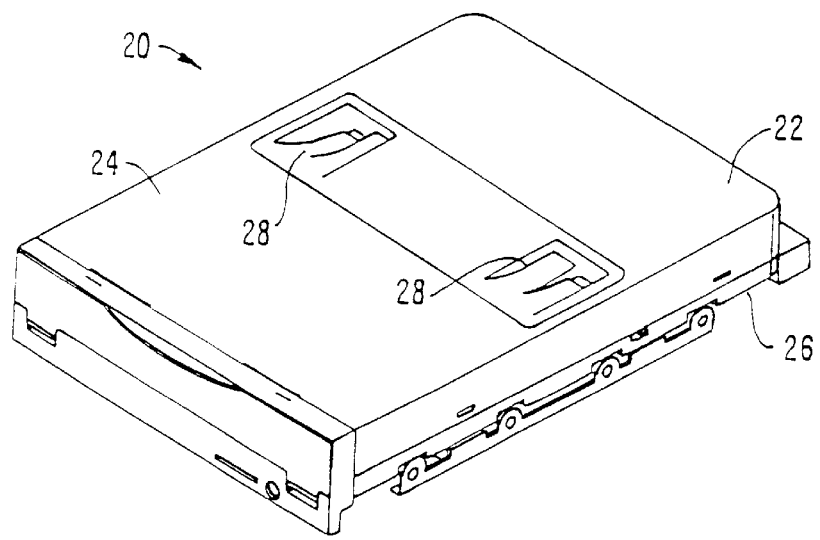
FIG. 1B is a perspective view of an internal disk drive similar to the external drive of FIG. 1A, in which the internal drive is adapted for insertion into a standard bay of a computer.

Referring now to FIGS. 1A and 1B, external disk drive 10 and internal disk drive 20 will share many of the same components. However, external drive 10 will include an enclosure 12 adapted for use outside a personal computer, high definition television, or some other data manipulation or display device. Additionally, external drive 10 will include standard I/O connectors, parallel ports, and/or power plugs similar to those of known computer peripheral or video devices.

Internal drive 20 will typically be adapted for insertion into a standard bay of a computer. In some embodiments, internal drive 10 may instead be used within a bay in a HDTV, thereby providing an integrated video system. Internal drive 20 may optionally be adapted for use with a bay having a form factor of 2.4 inches, 1.8 inches, 1 inch, or with any other generally recognized or proprietary bay. Regardless, internal drive 20 will typically have a housing 22 which includes a housing cover 24 and a base plate 26.

As illustrated in FIG. 1B, housing 24 will typically include integral springs 28 to bias the cartridge downward within the receiver of housing 22. It should be understood that while external drive 10 may be very different in appearance than internal drive 20, the external drive will preferably make use of base plate 26 and most or all mechanical, electromechanical, and electronic components of internal drive 20. Cover 24 may be modified for use with external drive 10 so that a label on the cartridge is at least partially visible through a window along the upper surface of enclosure 12 when the cartridge is in the drive.

Figure 2:
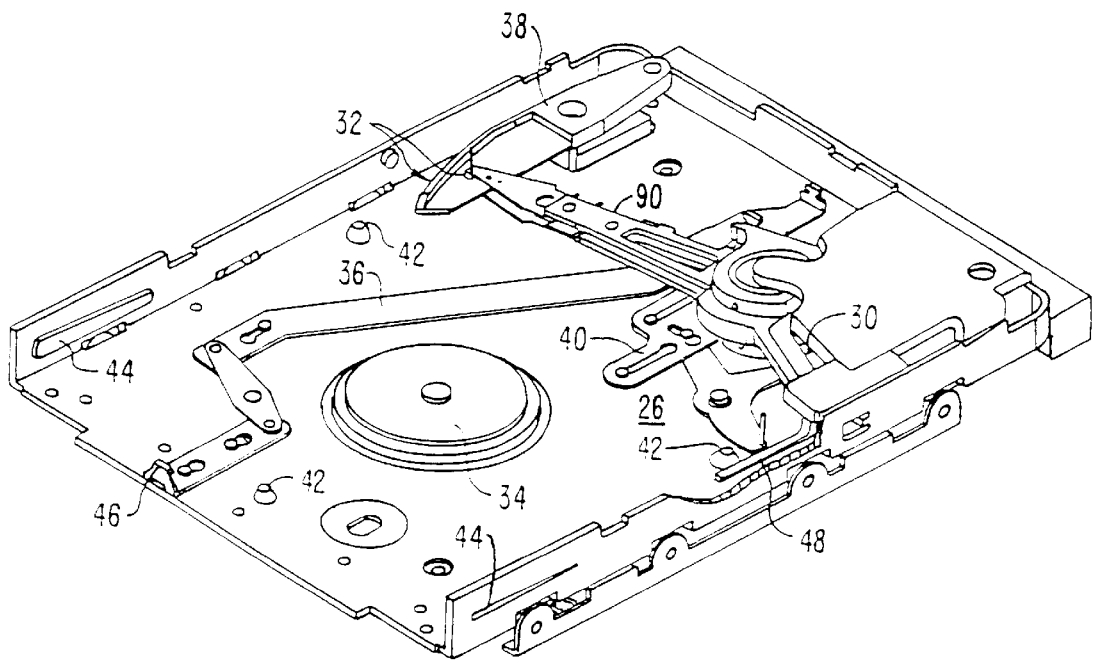
FIG. 2 is a perspective view of the internal disk drive of FIG. 1B, in which a cover of the disk drive has been removed to show a receptacle for the removable cartridge and some of the major drive components.

Many of the components of internal drive 20 are visible when cover 22 has been removed, as illustrated in FIG. 2. In this exemplary embodiment, a voice coil motor 30 positions first and second heads 32 along opposed recording surfaces of the hard disk while the disk is spun by spindle drive motor 34. The spindle drive motor will typically comprise a brushless DC motor, and the spindle drive structure will preferably rotate at a fixed position. A release linkage 36 is mechanically coupled to voice coil motor 30, so that the voice coil motor effects release of the cartridge from housing 22 when heads 32 move to a release position on a head load ramp 38. Head load ramp 38 is preferably adjustable in height above base plate 26.

A head retract linkage 40 helps to ensure that heads 32 are retracted from the disk and onto head load ramp 38 when the cartridge is removed from housing 22. Head retract linkage 40 may also be used as an inner crash stop to mechanically limit travel of heads 32 toward the hub of the disk.

Base 26 preferably comprises a steel sheet metal structure in which the shape of the base is substantially fully defined by stamping. The base structure and related methods are more fully described in co-pending patent application Ser. No. 08/971,033, filed concurrently herewith, the full disclosure of which is incorporated by reference. Bosses 42 are stamped into base 26 to engage and accurately position lower surfaces of the cartridge housing. To help ensure accurate centering of the cartridge onto spindle drive 34, rails 44 maintain the cartridge above the associated spindle until the cartridge is inserted to the appropriate depth, whereupon the cartridge descends under the influence of cover springs 28 and the force imparted by the user. This brings the hub of the disk down into engagement with spindle drive 34. A latch 46 of release linkage 36 engages a detent of the cartridge to restrain the cartridge within housing 22.

Figure 3:
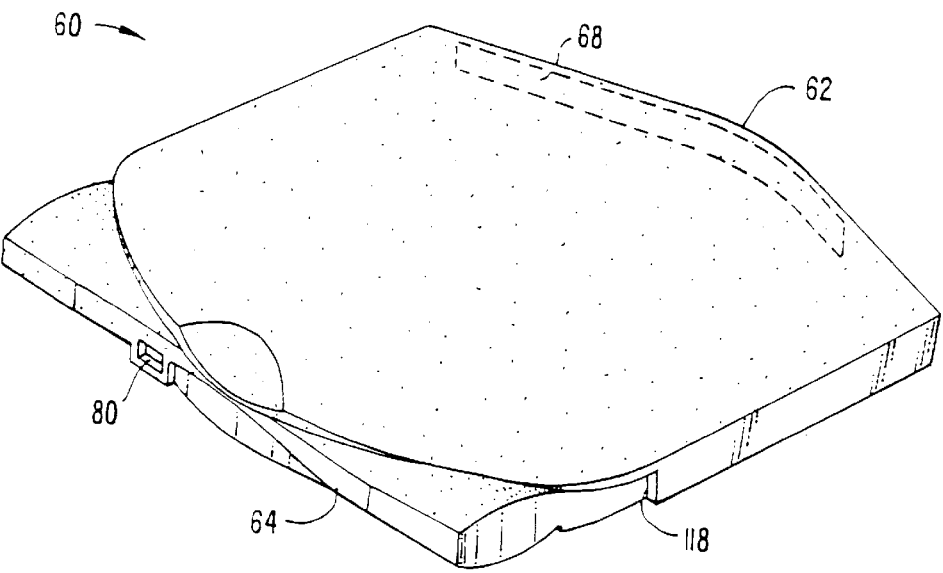
FIG. 3 is a perspective view of a removable cartridge housing a rigid magnetic recording disk.

A cartridge for use with internal drive 20 is illustrated in FIG. 3. Generally, cartridge 60 includes a front edge 62 and rear edge 64. A disk 66 (see FIG. 3A) is disposed within cartridge 62, and access to the disk is provided through a door 68. Optionally, a ridge may extend from rear edge of the cartridge to facilitate insertion and/or removal of the cartridge, and to avoid any interference between the housing surrounding the receptacle and the user's fingers. The door of the drive may include a corresponding bulge to accommodate such a ridge. An anti-rattle mechanism, ideally having a two-part arm (one portion comprising polymer molded integrally with the door, the other portion comprising a metal and extending from the polymer portion over the hub of the disk) prevents the disk from rattling within the cartridge when the cartridge is removed from the drive.

Figure 3A:
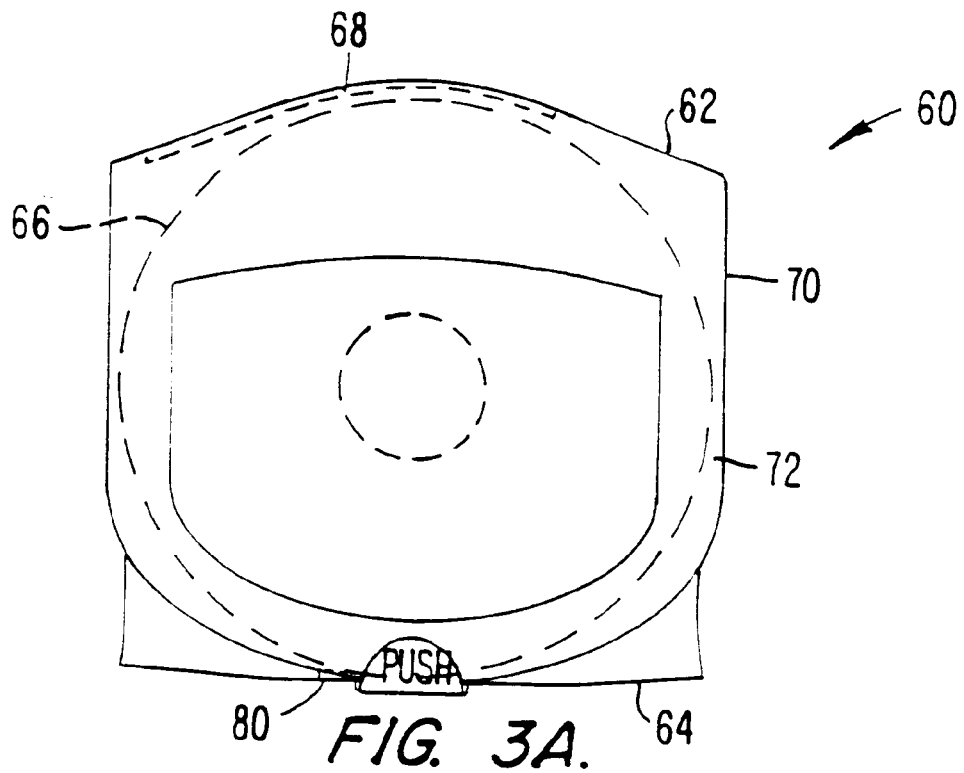
FIG. 3A is a top view of the cartridge of FIG. 3, showing an upper cartridge housing.
Figure 3B:
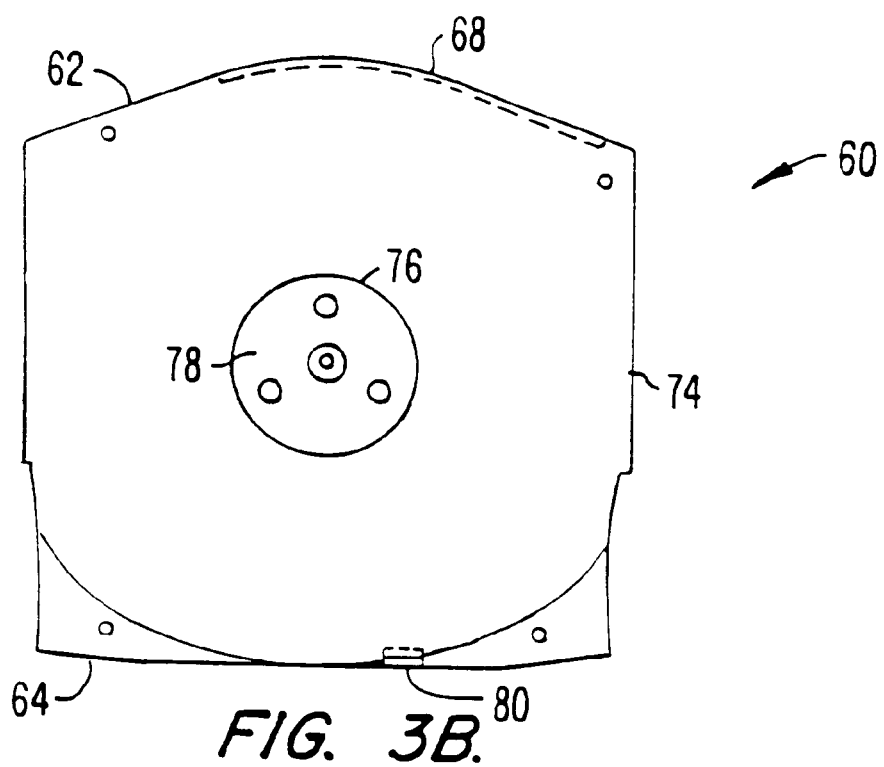
FIG. 3B is a bottom view of the cartridge of FIG. 3, showing a lower cartridge housing.

As can be understood most clearly with reference to FIGS. 3A and B, a housing 70 of cartridge 60 is generally formed from an upper housing portion 72 and a lower housing portion 74. An opening 76 in lower housing portion 74 provides access to a disk hub 78 for rotating engagement between the disk and spindle drive 34. Detent 80 of cartridge 60 is also illustrated in each of FIGS. 3–3B. This detent is engaged by latch 46 of internal drive 20 to restrain cartridge 60 in the receptacle of the disk drive.

Figure 3C:
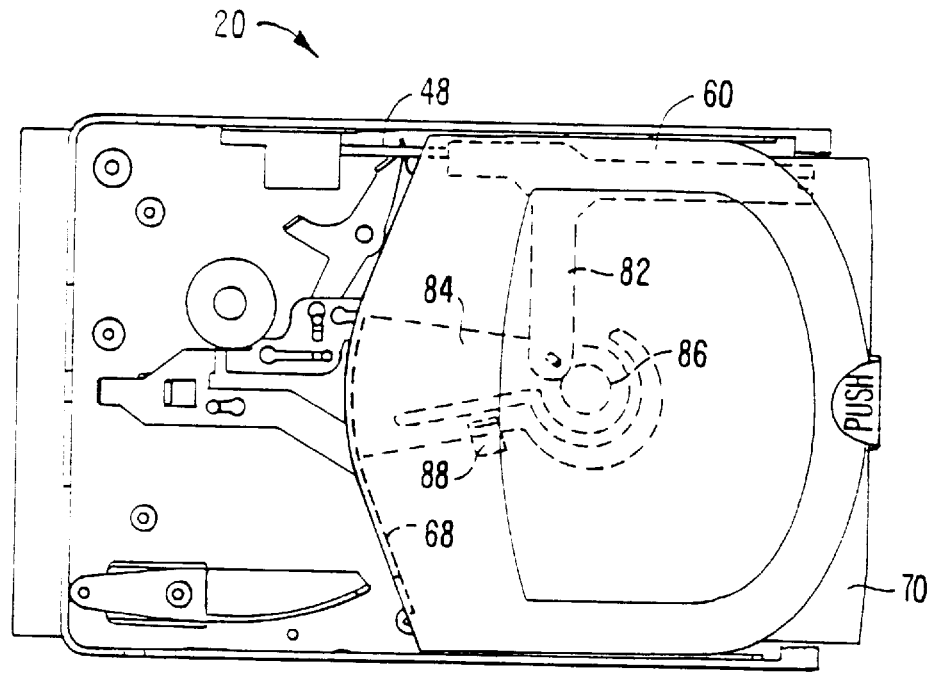
FIG. 3C is a top view illustrating the cartridge of FIG. 3 being inserted into the receptacle of the internal drive of FIG. 2, and also shows how a door actuation shaft of the receptacle engages a door opening link to open the door of the cartridge.

As can generally be understood with reference to FIG. 3C, door 68 is automatically opened when cartridge 60 is inserted into internal drive 20. Door 68 is opened by engagement between shaft 48 of the drive and a link 82 of the cartridge. Link 82 rotates a door assembly 84 about a cartridge pivot 86. In the exemplary embodiment, a ramp 88 on the inner surface of cartridge housing 70 deflects an arm of the door assembly to resiliently bias the disk against the cartridge housing and prevent rattling of (and the associated damage to) the disk when the cartridge is removed from internal drive 20.

Figure 4:
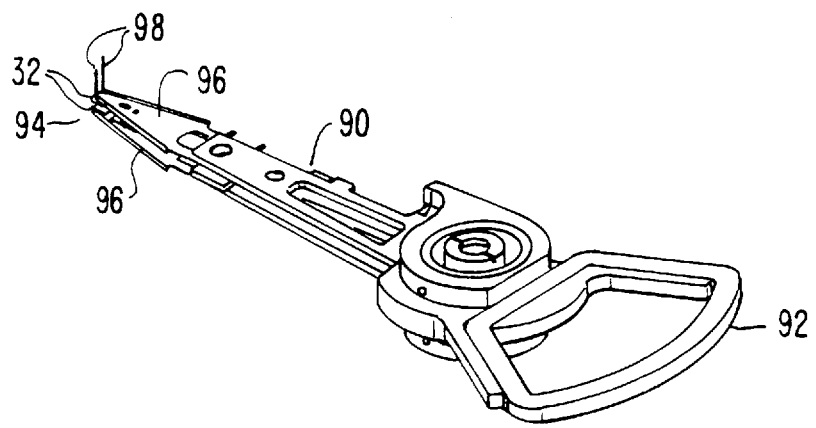
FIG. 4 is a perspective view of an arm supporting a pair of read/write heads, the arm being pivotably positioned by a voice coil motor.

As can be understood with reference to FIGS. 2 and 4, heads 32 are supported by an arm 90 which is pivotably mounted to base plate 26. Arm 90 is rotationally positioned by voice coil motor 30, and the arm generally defines a proximal end 92 and a distal end 94. Heads 32 are mounted to resilient arm extensions 96 at the distal end of arm 90. Heads 32 are oriented towards each other for reading opposed recording surfaces of the disk, and lifting wires 98 angle distally and laterally from arm extensions 96. This allows the wires to ride on head load ramp 38 while heads 32 are disposed adjacent the recording surface, and facilitates smoothly transferring the heads between the head load ramp and the recording surface. Alternatively, the lifting wires may extend laterally to a bend, and then distally from the bend, rather than being angled.

Heads 32 will often be separated from the spinning recording surface of disk 66 by a thin layer of air. More specifically, the data transfer head often glides over the recording surface on an "air bearing," a thin layer of air which moves with the rotating disk. Although recording densities are generally enhanced by minimizing the thickness of this air bearing, often referred to as the glide height, excessive contact between the head and the disk surface can decrease the reliability of the recording system. To avoid a head crash (in which the data transfer head contacts and damages the disk), the voice coil motor will generally position heads 32 on head load ramp 38 whenever the disk is rotating at insufficient velocity to maintain a safe glide height.

Figure 5:
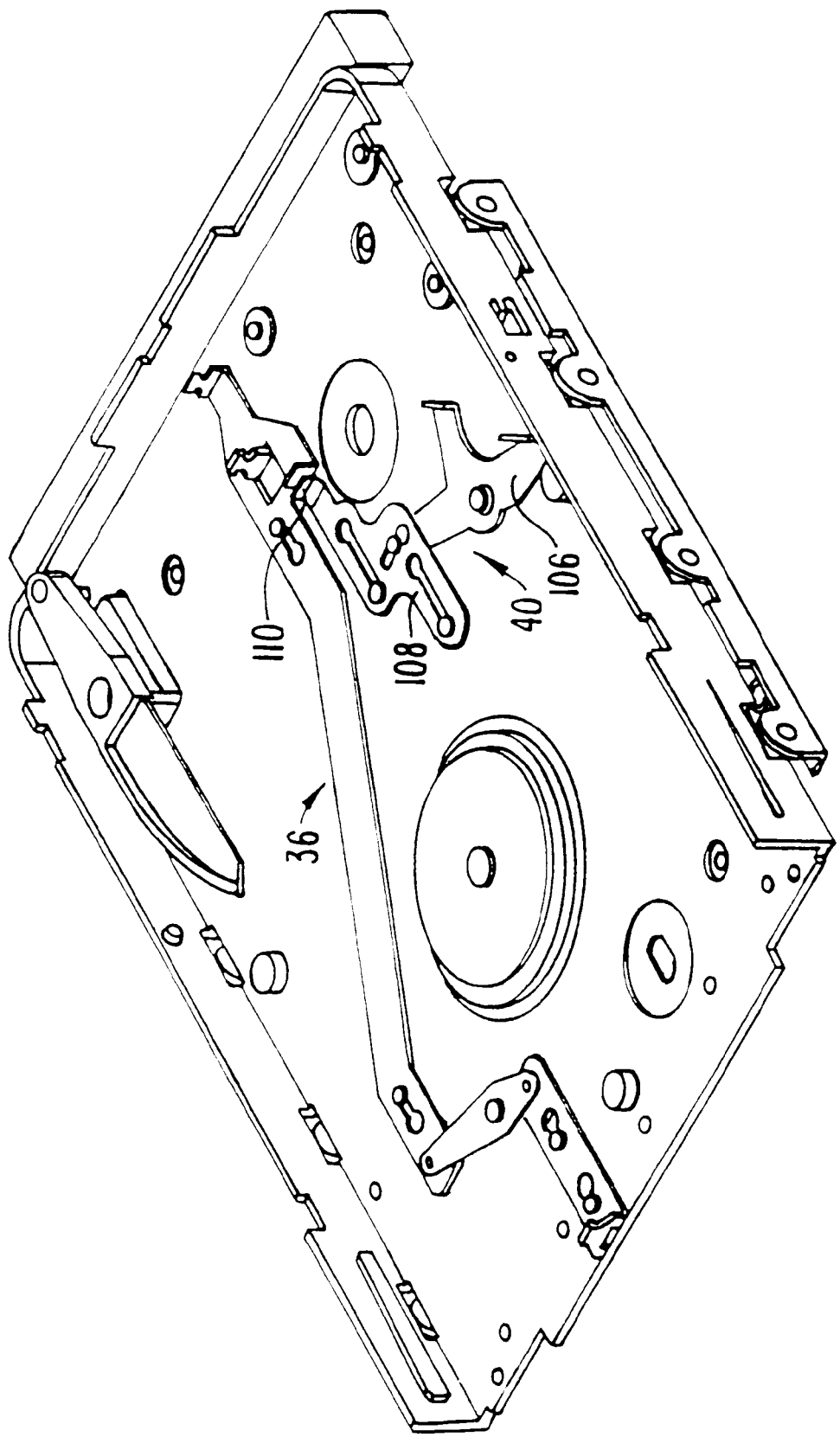
FIG. 5 is a simplified perspective view of the internal drive of FIG. 2, in which the voice coil motor and arm have been removed to show the cartridge release linkage and the head retract linkage.
Figure 5A:
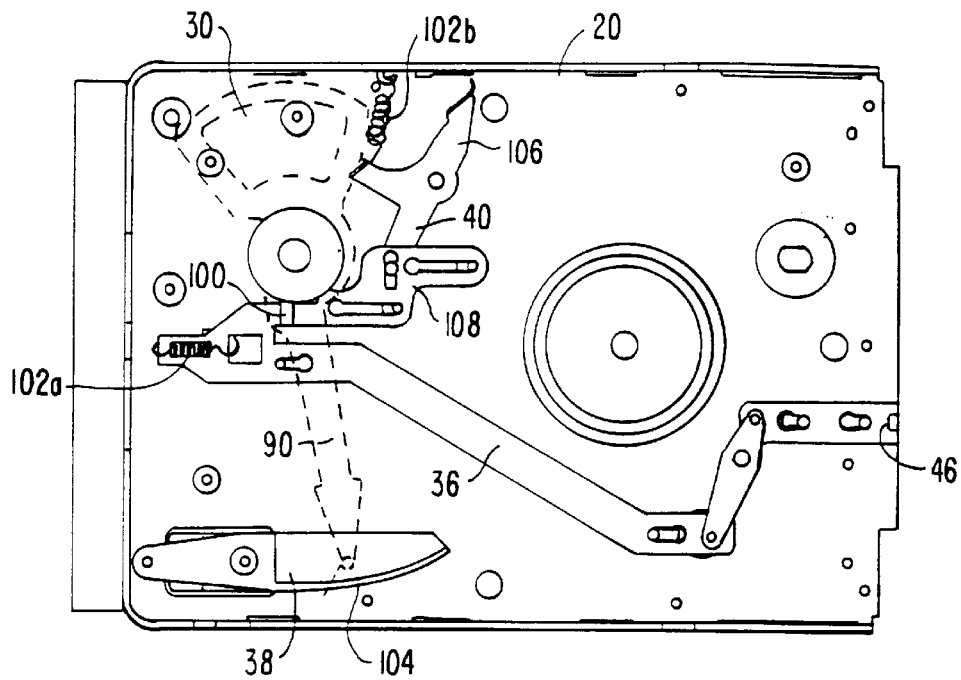
FIG. 5A is a top view of the internal drive of FIG. 2, and illustrates the position of the cartridge release linkage and head retract linkage when the cartridge is removed from the receptacle.

As can be understood with reference to FIGS. 5 and 5A, tab 100 of arm 90 is disposed between release linkage 36 and head retract linkage 40. The structure and operation of these linkages will be described with reference to FIGS. 5A–5D.

Figure 5B:
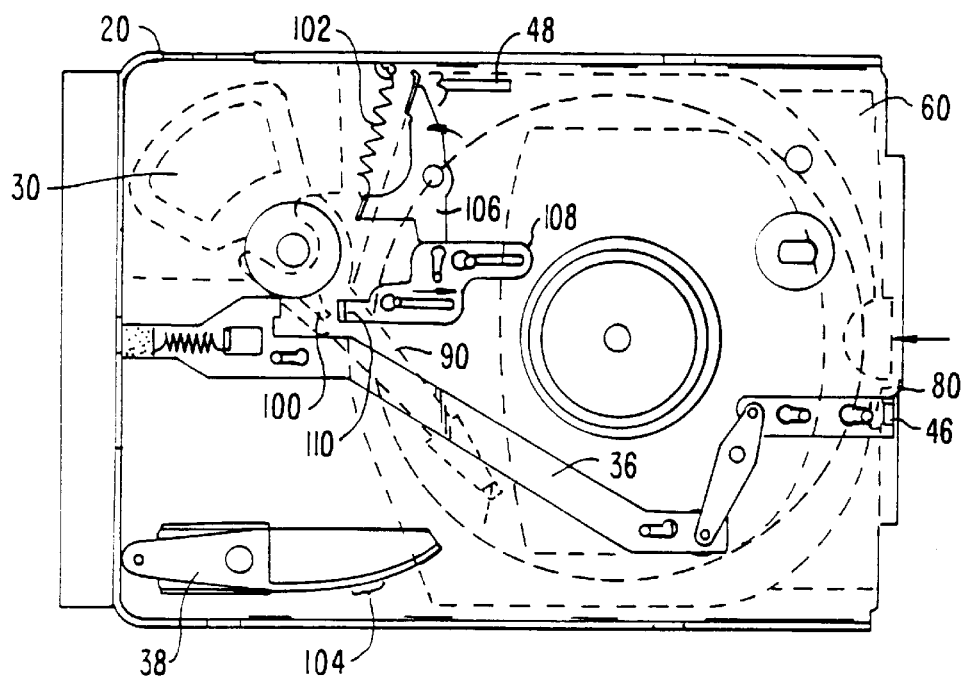
FIG. 5B is a top view of the internal drive of FIG. 2, and illustrates the position of the cartridge release linkage and head retract linkage when a cartridge is inserted in the receptacle and the voice coil motor positions the heads along the recording surface.

When no cartridge is disposed in internal drive 20, and when no power is supplied to voice coil motor 30, biasing springs 102 urge arm 90 to an intermediate or parked position 104, as illustrated in 5A. As cartridge 60 is inserted into the receptacle of internal drive 20, the cartridge rotates a head retract pivot 106. Head retract pivot 106, in turn, moves a slider 108 rearward, away from tab 100 of arm 90, so that the voice coil motor is free to pivot the arm from parked position 104 to selectively read data tracks from the recording surface of the disk, as illustrated in FIG. 5B. Cartridge 60 is held in the receiver of internal drive 20 by engagement of latch 46 with detent 80, as is also illustrated in FIG. 5B.

Conveniently, a tab 110 of head retract slider 108 prevents arm 90 from moving too far radially inward. Specifically, tab 110 engages tab 100 of arm 90 before the head moves dangerously close to the center of the spinning disk. Biasing spring 102 may help to resiliently rebound arm 90 away from the disk hub to a safe position, or a resilient material may be provided on tab 110 of slider 108, or on tab 100 of arm 90. Regardless, the use of the head retract linkage system as an inner crash stop can avoid the additional cost and complexity of providing a dedicated fixed inner crash stop structure.

Figure 5C:
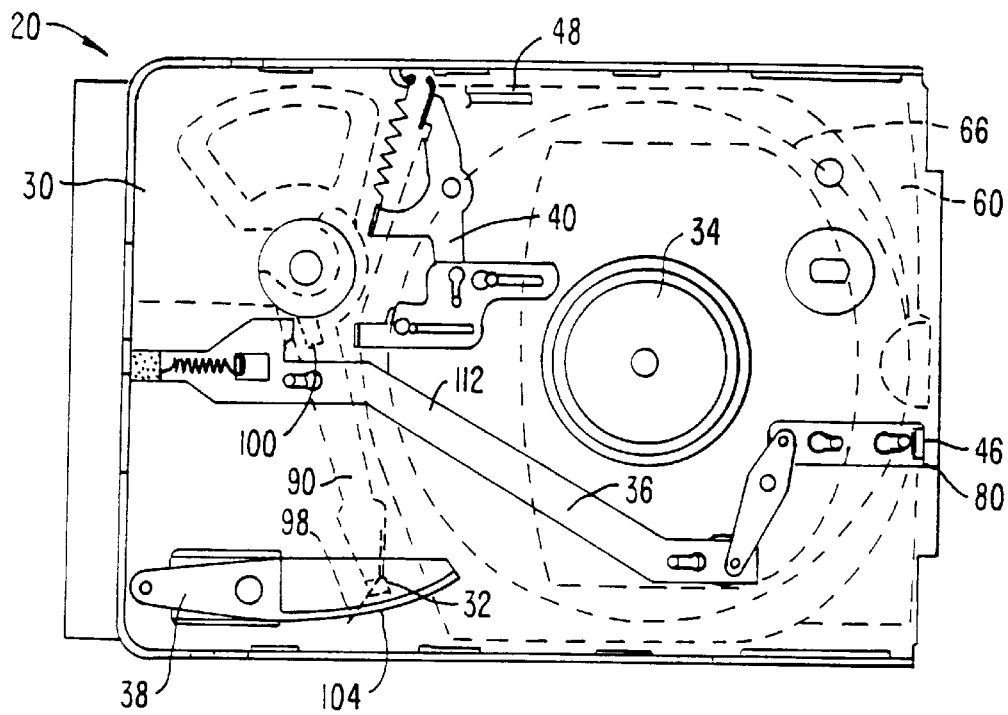
FIG. 5C is a top view of the internal drive of FIG. 2, and illustrates the position of the cartridge release linkage and head retract linkage when a cartridge is to be removed from the receptacle and the voice coil motor has moved the heads to an intermediate position along a head load ramp to allow the disk to safely spin down.
Figure 5D:
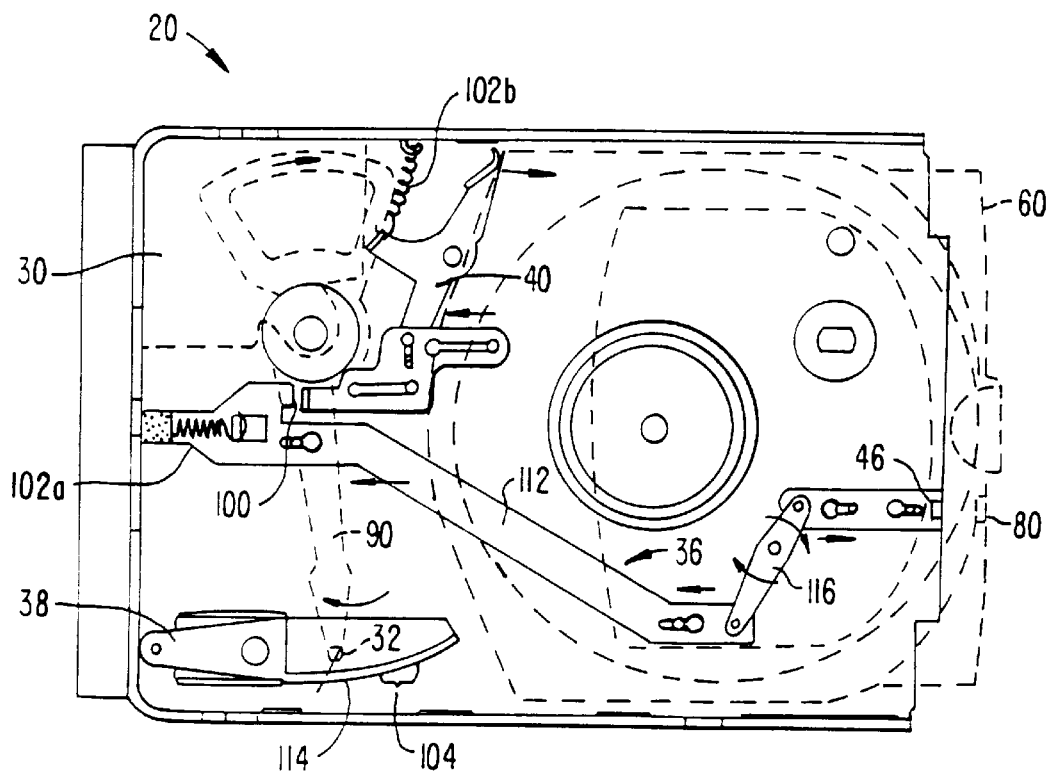
FIG. 5D is a top view of the internal drive of FIG. 2, showing the voice coil motor releasing the cartridge from the receptacle by moving the heads to a release position, so that the arm articulates the cartridge release linkage and a biasing system expels the cartridge.

FIGS. 5C and 5D illustrate the use of voice coil motor 30 to effect release of cartridge 60 from the receiver of internal drive 20. Prior to release of the cartridge 60 from the receiver of internal drive 20, voice coil motor 30 pivots arm 90 to move the heads from disk 66 to head load ramp 38. As described above, wires 98 engage the ramp while the heads are still disposed along the recording surface of the disk. This arrangement provides a smooth transfer of the heads between their gliding position over the recording surface and their parked position along the head load ramp. Additionally, wires 98 will generally support heads 32 with the heads separated from the adjacent surface of head load ramp 38 to minimize wear and avoid contamination of the head surface.

Once the heads are safely parked along the head load ramp 38 at park position 104, disk 66 may be safely spun down without fear of the heads crashing into the recording surface. Spindle drive 32 may slow the rotation of disk 66 using a brake mechanism to minimize delay. In some embodiments, the kinetic energy from rotating disk 66 and spindle drive 32 may be converted to electrical energy by using the spindle drive motor as a generator. This electrical energy can be stored in a capacitor or the like, and may be used to drive voice coil motor 30 after a shut down, particularly after an emergency shut down when normal power for the voice coil motor is otherwise not available. Hence, the electrical energy generated from the residual kinetic energy of the drive system, which is sometime referred to as "back-EMF," is particularly advantageous for preventing heads 32 from crashing into the recording surface when spindle motor 32 loses power without warning, as the back-EMF can be used to move the heads to the head load ramp.

Regardless of whether voice coil motor 30 actuates arm 90 from a standard power supply or using back-EMF, disk 66 will generally be slowed to a safe cartridge handling speed while heads 32 are disposed at park position 104. In most embodiments, disk 66 will come to a complete stop while cartridge 60 is disposed within internal drive 20. Generally, this will take between about 0.5 and 10.0 seconds, disk 66 ideally slowing from its normal operating speed in about 5.0 seconds.

Once disk 66 has slowed and/or stopped, voice coil motor 30 pivots arm 90 so that tab 100 of the arm engages and moves a release slider 112 of release linkage 36, as illustrated in FIG. 5D. Biasing spring 102 prevents inadvertent actuation of release linkage 36, and the voice coil motor 30 overcomes the biasing spring to move head 32 from park position 104 to a release position 114. As tab 100 slides release slider 112, the release slider rotates a release pivot 116. Rotation of release pivot 116, in turn, slides latch 46 rearward, disengaging the latch from detent 80 of cartridge 60. Therefore, voice coil motor 30 (which is generally adapted for accurate positioning of heads 32 along the recording surface of disk 66) is also used to effect movement of release linkage 36 so as to release the cartridge from the receiver of internal drive 20.

Figure 6A:
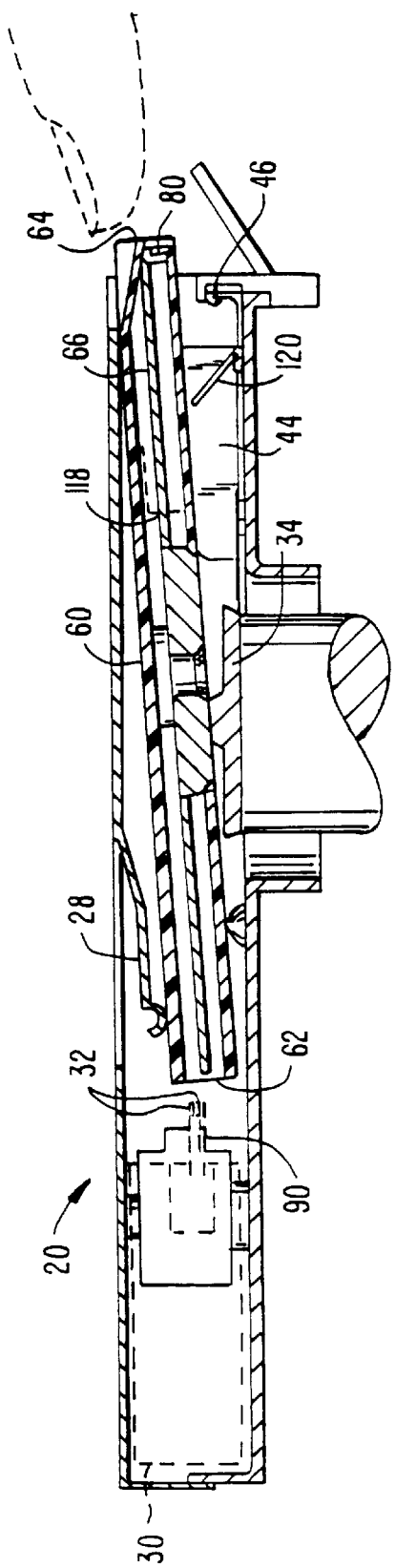
FIG. 6A is a cross-sectional side view of the internal drive of FIG. 2 with the cartridge partially inserted, showing the engaging surfaces of the cartridge and the receptacle which ensure that the cartridge aligns with the spindle motor, and also showing the cover springs which bias the forward end of the cartridge downward, and the base springs which bias the rear end of the cartridge upward.
Figure 6B:
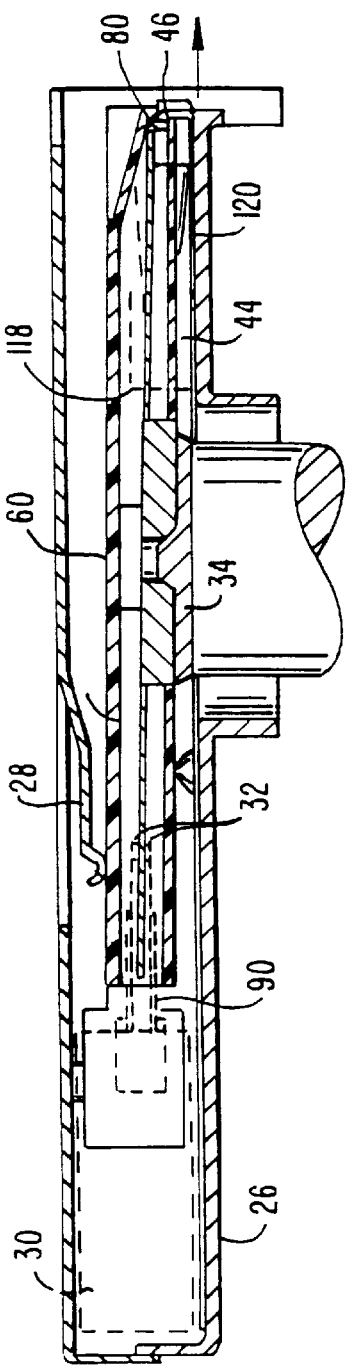
FIG. 6B is a cross-sectional view similar to FIG. 6A, in which the cartridge is latched in the receptacle.

After cartridge 60 is unlatched from the receiver of internal drive 20, the cartridge will normally be expelled from the receiver by a biasing system. The use of the biasing system can be understood with reference to FIGS. 5D, 6A, and 6B. During insertion, cover springs 28 urge forward edge 62 of cartridge 60 downward, while rear edge 64 remains elevated so long as the cartridge rides along rails 44. As the user slides cartridge 60 manually into the receiver, head retract link 40 places the attached biasing spring 102 under tension. Once disk 66 is substantially aligned with spindle drive 34, the cartridge housing is clear of rails 44. More specifically, rear side indentations 118 (see FIG. 3) allow rear edge 64 of the cartridge to drop downward.

The downward movement of rear edge 64 is opposed by base springs 120. These base springs generally comprise simple wire structures screwed or otherwise fastened to base 26, and the upward urging force imposed on cartridge 60 by the base springs is again manually overcome during insertion. As base springs 120 are compressed against base 26, latch 46 slides into detent 80, so that the latch restrains cartridge 60 within the receiver of internal drive 20. Simultaneously, spindle drive 34 aligns with and engages the hub of disk 66. Spindle drive 34 includes a protruding, tapering nose and a magnetic chuck, while a corresponding countersunk armature is provided at the hub of disk 66. This arrangement promotes centering and alignment of disk 66 on spindle drive 34, and helps ensure a secure driving engagement between these two structures. As described above, the door of the cartridge opens automatically during insertion of the cartridge, while actuation of head retract linkage 40 during insertion also frees arm 90 to move heads 32 from head load ramp 38, and to position recording surfaces 122 along the opposed major surfaces of disk 66.

Base springs 120 and the head retract linkage expel the disk from the receptacle of internal drive 20. Once voice coil motor 30 actuates release linkage 36 so as to disengage latch 46 from detent 80, engagement between rails 44 and rear indents 118 generally prevents the cartridge from sliding out of the housing along the plane of the disk. Instead, base springs 120 first urge rear edge 64 of cartridge 60 upward, safely disengaging spindle drive 34 from the hub of the disk. Once these driving structures are disengaged, biasing spring 102b of head retract linkage 40 urges cartridge 60 out of the receiver, and also ensures that arm 90 is safely positioned with heads 32 along head load ramp 38. Generally, the biasing system will slide the cartridge rearward until a portion of the cartridge extends from the drive, so that the cartridge can be easily removed and replaced manually by the user.

Figure 7A:
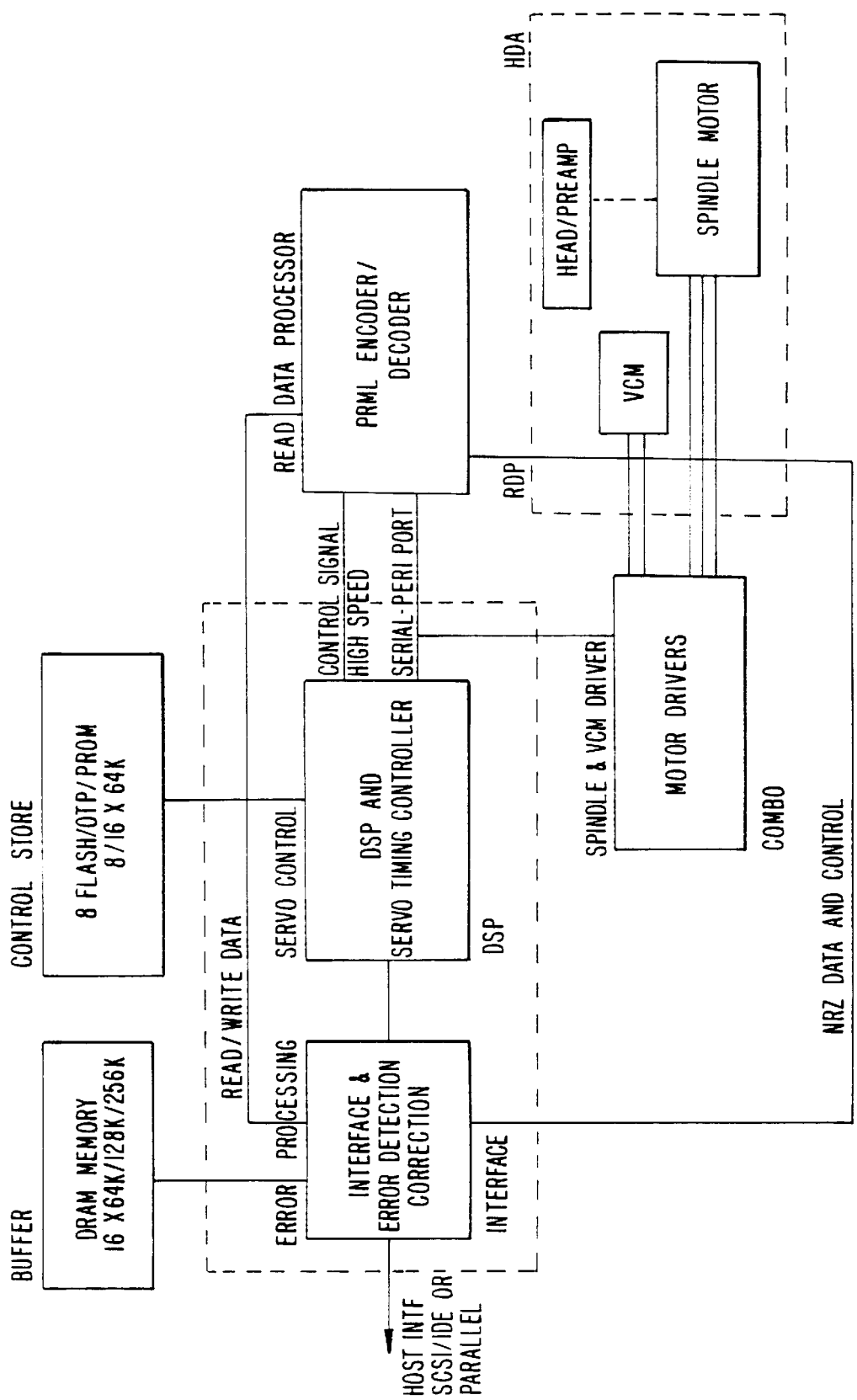
FIGS. 7A and 7B are functional block diagrams which schematically illustrate the signal processing and power circuitry of the internal drive of FIG. 2.
Figure 7B:
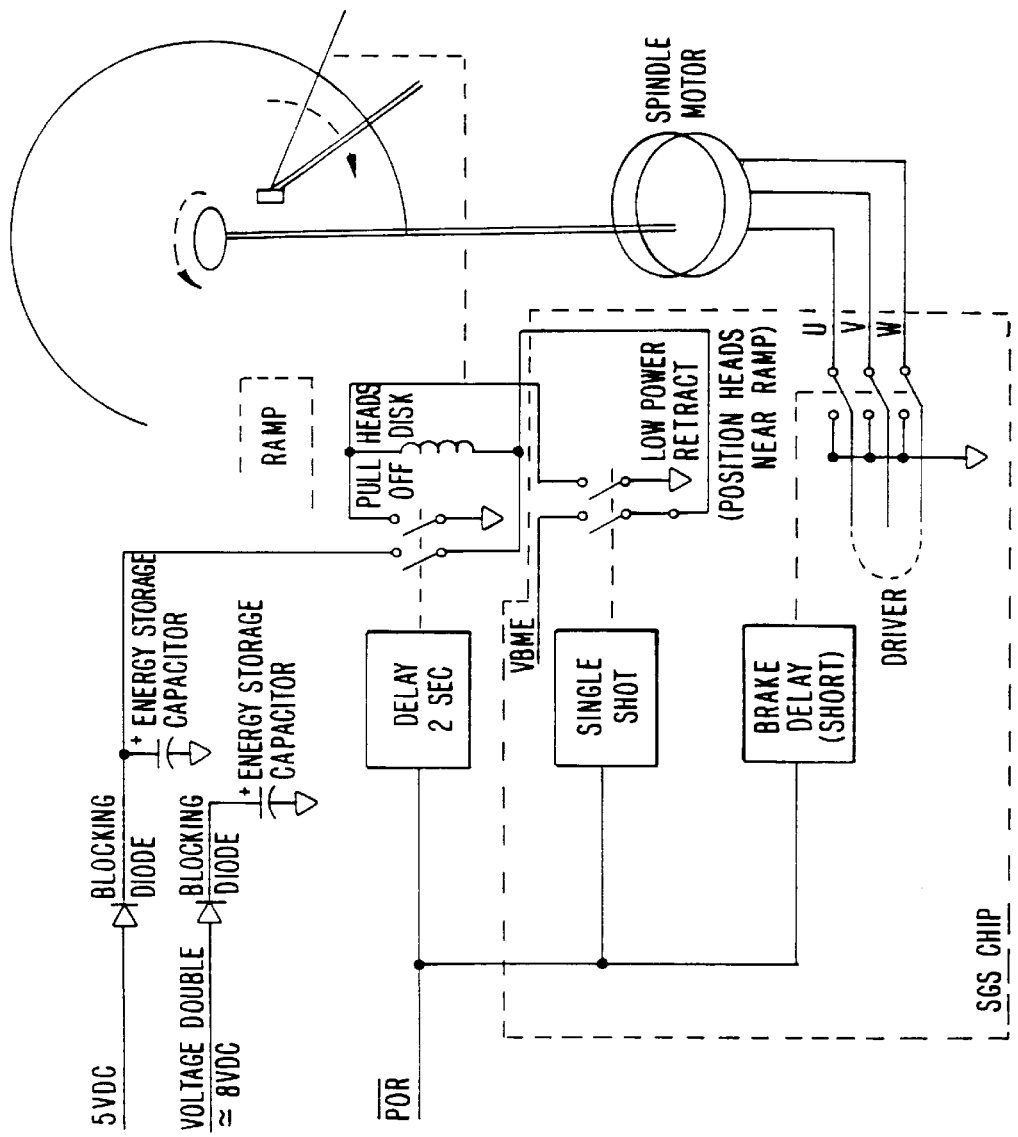

FIGS. 7A and 7B are functional block diagrams which schematically illustrate the data transfer and power distribution scheme of the drive, respectively. FIG. 7A schematically illustrates the major control and data transfer structures and connections of the drive. The component interaction which allows the use of back-EMF for actuation of the voice coil motor can generally be understood with reference to FIG. 7B. Related structures and methods may also be described in U.S. patent application Ser. No. 08/970,859, filed concurrently herewith, the full disclosure of which is incorporated herein by reference.

Although the exemplary embodiment has been described in some detail, for clarity of understanding and by way of example, a variety of changes, adaptations, and modifications will be obvious to those of skill in the art. Therefore, the scope of the present invention is limited solely by the amended claims.

What is claimed is:

1. A system for storing and retrieving video and other digital data, the system comprising;
    a cartridge containing a disk, the disk having a recording surface;
    a housing defining a receptacle which receives the cartridge;
    a release mechanism disposed adjacent the receptacle to releasably restrain the cartridge within the receptacle;
    a data transfer head;
    an arm coupled to the housing and supporting the data transfer head; and
    a motor adapted to position the head along the recording surface for transferring data therebetween, the motor disposed adjacent the receptacle and adapted to move the arm to engage the release mechanism to release the cartridge from the receptacle after the disk has safely spun down.

2. A system as claimed in claim 1, wherein the system is adapted for playing a movie.

3. A system as claimed in claim 1, further comprising a brake mechanism to spin down the disk.

4. A system as claimed in claim 3, wherein the motor releases the cartridge from the receptacle after the disk has stopped spinning.

5. A disk drive for use with a cartridge, the cartridge containing a rigid magnetic recording disk having at least one recording surface, the disk drive comprising:
    a housing defining a receptacle which receives the cartridge;
    an arm movably coupled to the housing;
    a data transfer head supported by the arm;
    a voice coil motor coupled to the arm, the voice coil motor adapted to position the head along the recording surface of the disk for transferring data therebetween, the voice coil motor capable of moving the head from the recording surface to first and second positions; and
    a linkage disposed within the receptacle of the housing, the linkage engagable by the arm to release the cartridge, the linkage restraining the cartridge in the receptacle when the head is at the first position to safely spin down the disk, the linkage releasing the cartridge from the receptacle when the arm moves the head to the second position to engage the linkage.

6. A disk drive as claimed in claim 5, further comprising a spindle motor attached to the housing, the spindle motor coupleable with the disk within the cartridge to spin the disk, the spindle motor capable of providing a residual energy when power to the spindle motor is interrupted, and circuitry coupled to the voice coil and the spindle motor, wherein the circuitry directs the residual energy from the spindle motor to the voice coil motor so as to move the head beyond the recording surface to the first position for a spin-down period, and from the first position to the second position after the spin-down period.

7. A disk drive for use with a cartridge, the cartridge containing a rigid magnetic recording disk having at least one recording surface, the disk drive comprising:
    a housing defining a receptacle which receives the cartridge;
    an arm movably coupled to the housing;
    a data transfer head supported by the arm;
    a voice coil motor coupled to the arm, the voice coil motor adapted to position the head along the recording surface of the disk for transferring data therebetween, the voice coil motor capable of moving the head from the recording surface to first and second positions; and
    a linkage disposed within the receptacle of the housing, the linkage actuatable by the voice coil motor to release the cartridge, the linkage restraining the cartridge in the receptacle when the head is at the first position to safely spin down the disk, the linkage releasing the cartridge from the receptacle when the voice coil motor moves the head to the second position to actuate the linkage,
    wherein the linkage comprises a capture element and a drive element, wherein the capture element engages the cartridge so as to prevent release of the cartridge from the receptacle when the capture element is at a locked position, wherein the arm engages a surface of the drive element and moves the drive element when the head moves toward the second position, and wherein movement of the drive element by the arm moves the capture element from the locked position to a release position to allow removal of the cartridge from the receptacle.

8. A disk drive as claimed in claim 7, further comprising a biasing mechanism attached to the housing for urging the cartridge out of the receptacle when the capture element is in the release position, wherein the receptacle is adapted for manual insertion of the cartridge by overcoming the biasing mechanism.

9. A disk drive as claimed in claim 8, wherein the disk drive includes no more than two electromechanical actuators, wherein the voice coil motor comprises a first electromechanical actuator, and wherein the spindle motor comprises a second electromechanical actuator.

10. A disk drive system comprising;
    a cartridge containing a rigid recording disk, the disk having a recording surface;
    a housing having means for receiving the cartridge;
    means for transferring data from the recording surface, the data transfer means movable along the recording surface;
    means for releasing the cartridge after the recording disk is safely spun down; and
    means for positioning the data transfer means along the recording surface, the positioning means coupled to the cartridge receiving means so that the cartridge is released from the cartridge receiving means by engagement of the releasing means by the positioning means.

11. A system for storing and retrieving video digital data, the system comprising:
- a cartridge containing a disk, the disk having a recording surface;
- a housing defining a receptacle which receives the cartridge;
- a release mechanism having a movable drive element and a capture element movable between a locked position and a release position;
- an arm movably coupled to the housing
- a data transfer head supported by the arm; and
- a motor adapted to position the head along the recording surface for transferring data therebetween, wherein the motor moves the arm to engage the drive element, wherein actuation of the drive element moves the capture element from the locked position to the release position to allow removal of the cartridge from the receptacle.

12. A system as recited in claim 11, wherein the motor actuates the drive element after the disk has been safely spun down to a safe handling speed.

* * * * *